United States Patent
Shull

(10) Patent No.: US 9,050,725 B2
(45) Date of Patent: Jun. 9, 2015

(54) TOOL CONTROL SYSTEM BASED ON ANTICIPATED TERRAIN

(75) Inventor: Andrew G. Shull, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 2021 days.

(21) Appl. No.: 11/976,397

(22) Filed: Oct. 24, 2007

(65) Prior Publication Data

US 2009/0112410 A1 Apr. 30, 2009

(51) Int. Cl.
*G06F 7/70* (2006.01)
*B25J 9/16* (2006.01)

(52) U.S. Cl.
CPC ..... *B25J 9/1664* (2013.01); *G05B 2219/40512* (2013.01); *G05B 2219/45012* (2013.01)

(58) Field of Classification Search
CPC ........... E02F 3/845; E02F 3/844; E02F 3/847; E02F 3/842; E02F 9/2025; E02F 9/2029; E02F 9/2045; E02F 9/26; E02F 3/26; E02F 3/435; E02F 3/7613; E02F 3/765; E02F 9/2225; E02F 9/2285; E02F 9/2296
USPC .............................. 701/50, 470, 477; 342/357
See application file for complete search history.

(56) References Cited

U.S. PATENT DOCUMENTS

| | | | |
|---|---|---|---|
| 4,261,617 A * | 4/1981 | Droscher et al. | 299/1.8 |
| 4,630,685 A | 12/1986 | Huck, Jr. et al. | |
| 4,807,131 A * | 2/1989 | Clegg | 701/50 |
| 5,144,317 A * | 9/1992 | Duddek et al. | 342/357.27 |
| 5,174,385 A | 12/1992 | Shinbo et al. | |
| 5,499,684 A | 3/1996 | Stratton | |
| 5,519,620 A * | 5/1996 | Talbot et al. | 701/214 |
| 5,551,518 A | 9/1996 | Stratton | |
| 5,560,431 A | 10/1996 | Stratton | |
| 5,819,190 A | 10/1998 | Nakagami et al. | |
| 5,860,480 A | 1/1999 | Jayaraman et al. | |
| 5,984,018 A | 11/1999 | Yamamoto et al. | |
| 5,996,702 A * | 12/1999 | Hall | 172/4.5 |
| 6,223,110 B1 | 4/2001 | Rowe et al. | |
| 6,269,885 B1 | 8/2001 | Barber et al. | |
| 6,273,198 B1 | 8/2001 | Bauer et al. | |
| 6,845,311 B1 | 1/2005 | Stratton et al. | |
| 7,121,355 B2 | 10/2006 | Lumpkins et al. | |
| 7,184,926 B2 | 2/2007 | Jarrott | |
| 7,210,395 B2 | 5/2007 | Strandberg et al. | |

* cited by examiner

*Primary Examiner* — Redhwan K Mawari
(74) *Attorney, Agent, or Firm* — Finnegan, Henderson, Farabow, Garrett & Dunner, LLP

(57) ABSTRACT

A tool control system for controlling a tool of a machine is disclosed. The tool control system includes a tool configured to shape a surface of a worksite. The tool control system also includes a positioning system configured to determine a worksite position of a machine supporting the tool. The tool control system also includes a controller configured to receive a site map containing a profile of the surface, receive the worksite position of the machine, and determine a contour of the surface not yet traversed by the machine. The controller also being configured to anticipate an effect on the contour caused by the tool when the machine traverses the contour, and to move the tool and accommodate the affect before the machine traverses the contour.

19 Claims, 3 Drawing Sheets

TOOL CONTROL SYSTEM BASED ON ANTICIPATED TERRAIN

TECHNICAL FIELD

The present disclosure relates to a control system, and, more particularly, to a tool control system based on anticipated terrain.

BACKGROUND

Machines such as, for example, dozers, loaders, excavators, motor graders, and other types of machines, are used in a variety of terrain-shaping operations. One such operation may be the removal and/or repositioning of material from a worksite. In such an operation, it may be desired to efficiently and precisely control the amount of material being moved at any instant by varying a cutting depth of a ground-engaging tool used to move the material. Manual control of the tool may be inefficient, particularly over a period of time as an operator tires. Additionally, manual control may be imprecise because an operator may react too slowly to changing terrain conditions. For example, as a contour of the terrain changes, quick tool adjustment may be necessary to account for changes in the machine pitch, the machine roll, and the terrain elevation that could cause an undesired removal and/or repositioning of the material. To achieve maximum control and efficiency, many machines rely on automatic systems to vary the cutting depth of the tool.

One method of automatically controlling the tool of an earthmoving machine is described in U.S. Pat. No. 6,845,311 (the '311 patent), issued to Stratton et al. on Jan. 18, 2002. The '311 patent discloses a system that controls the machine and a blade position of a bulldozer to maximize an efficiency of the machine in a load-carrying operation. The system of the '311 patent controls the machine and blade based on a measured slip coefficient, a machine speed, a machine slope, a machine pitch rate, a blade lift height, and a blade angle. The '311 system also adjusts the blade based on a position of the machine and a ground profile contained in a site map.

Although the system disclosed in the '311 patent may provide automated machine control, the control may be limited. Specifically, to adjust blade position, the '311 system relies on real-time measurements of both the pitch and the pitch rate of the machine and performing subsequent calculations based on those measurements. Then a corresponding blade adjustment can be made. While this sequence may be performed quickly enough to adjust the blade in a heavily loaded (i.e slow moving) machine, the sequence may be too slow to effectively control a machine with a light or empty load that moves quicker. This may be because a lightly loaded machine may have higher pitch and roll velocities that cause the machine to lurch more quickly than the control system processors and blade hydraulics of the '311 patent can respond. While the '311 patent may help alleviate some of the above problems, the '311 patent may not anticipate changing machine positions due to changing ground profiles or pre-emptively adjusting the position of the blade. Therefore under a light or empty load the '311 patent may react too slowly to prevent an undesired removal and/or repositioning of material.

The disclosed control system is directed to overcoming one or more of the problems set forth above.

SUMMARY

In one aspect, the present disclosure is directed toward a tool control system, including a tool configured to shape a surface of a worksite. The tool control system may also include a positioning system configured to determine a worksite position of a machine supporting the tool. The tool control system may also include a controller configured to receive a site map containing a profile of the surface, receive the worksite position of the machine, and determine a contour of the surface not yet traversed by the machine. The controller may also be configured to anticipate an effect on the contour caused by the tool when the machine traverses the contour, and to move the tool and accommodate the effect before the machine traverses the contour.

In another aspect, the present disclosure is directed toward a method of controlling a tool of a machine. The method may include receiving a current site map and determining a position of a machine supporting the tool. The method may also include determining a trajectory of the machine and tool, and determining a surface contour not yet traversed by the machine. The method may further include anticipating an effect on the surface contour caused by the tool when the machine traverses the surface contour, as well as moving the tool to accommodate the effect before the machine traverses the surface contour.

DETAILED DESCRIPTION

Figure 1:
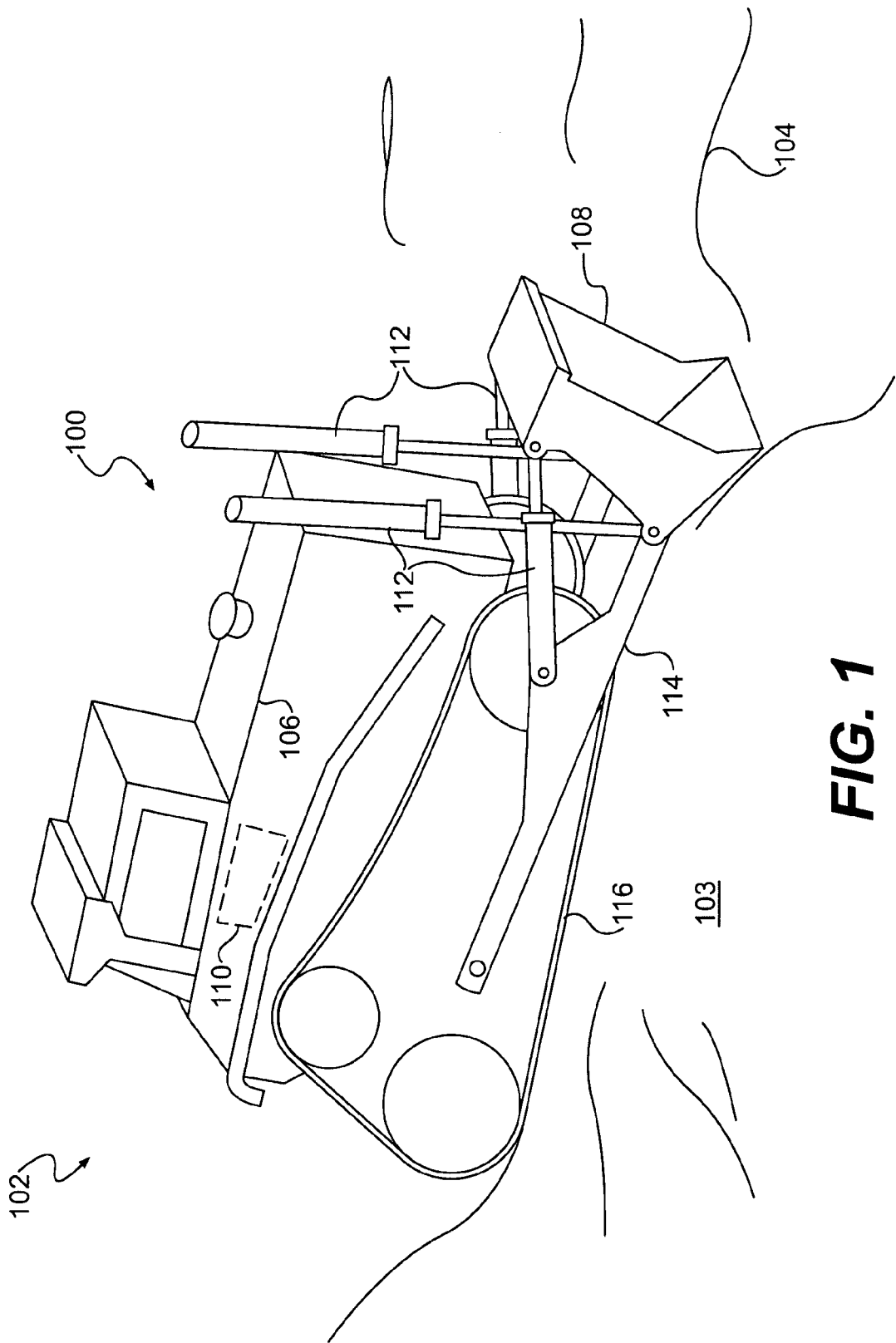
FIG. 1 is a pictorial illustration of an exemplary disclosed machine.

FIG. 1 illustrates an exemplary disclosed machine 100. Machine 100 may be a mobile machine that performs some type of operation associated with an industry such as mining, construction, farming, or other known industries within the art. For example, machine 100 may be a dozer, a loader, a backhoe, an excavator, a motor grader, or any other machine known in the art for removing, depositing, and/or repositioning a material 103. Machine 100 may be configured to traverse a worksite 102 to shape a surface 104 by removing and/or repositioning material 103 within worksite 102. Material 103 my include earth, debris, snow, and/or any other material desired to be removed and/or repositioned. Machine 100 may include a frame 106, a tool 108 connected to frame 106, and a tool control system 110 configured to regulate the operations of tool 108.

Frame 106 may include any structural unit that supports movement of machine 100. Frame 106 may be, for example, a stationary base frame connecting an engine (not shown) to a traction device 116 and/or to tool 108. Frame 106 may also be a movable frame member of a linkage system, or any other type of frame known in the art. It is contemplated that traction device 116 may include tracks, wheels, and/or other traction devices known in the art.

Tool 108 may include any implement used in material handling. For example, tool 108 may include a blade, a scraper, a bucket, a set of forks, a snow plow, and/or other types of implements known in the art. Tool 108 may be coupled to frame 106 via at least one actuator 112, such as a hydraulic cylinder or a motor. Tool 108 may also be coupled to frame 106 via a linkage system 114 and may be selectively movable relative to frame 106 by actuator 112. Tool 108 may be configured to pivot, rotate, slide, swing, or otherwise move relative to frame 106 in any manner known in the art. It is contemplated that tool 108 may include multiple implements configured to handle material 103, if desired.

Actuator 112 may be a double-acting, linear hydraulic cylinder that uses pressurized fluid to extend and retract a piston within a tubular housing. One end of actuator 112 may be pivotally attached to frame 106, and the other end may be pivotally attached to tool 108. Actuator 112 may be connected to a hydraulic system (not shown) that provides high pressure fluid to actuator 112. It is contemplated that machine 100 may include any number of actuators 112 to facilitate the movement of tool 108. Alternatively, actuator 112 may be any other type of device known in the art capable of extending and retracting to move tool 108 relative to frame 106, if desired.

Figure 2:
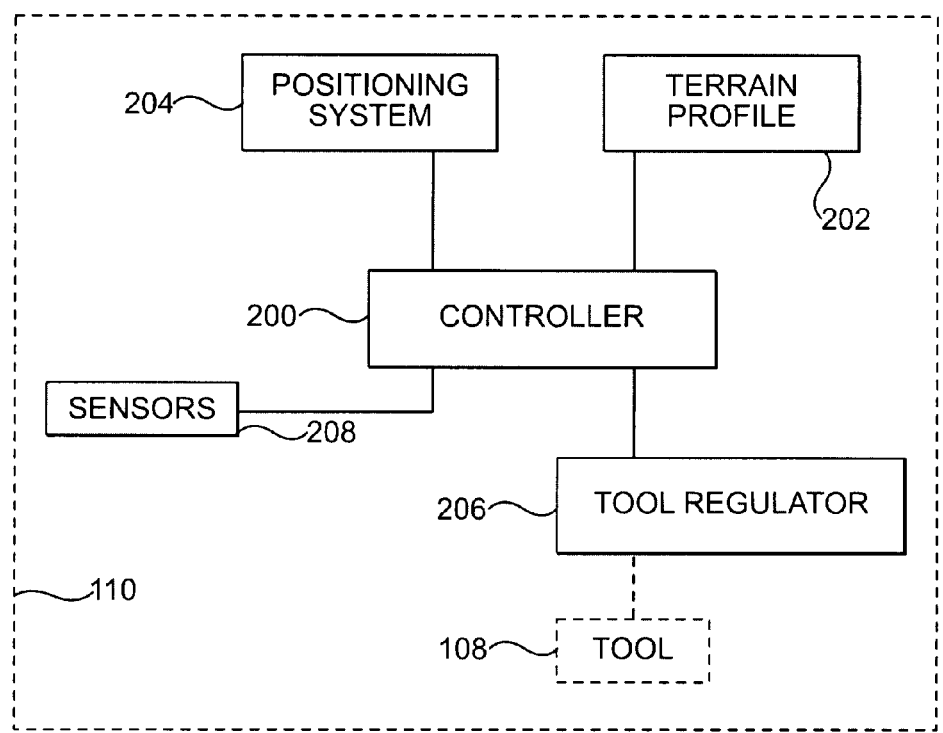
FIG. 2 is a schematic illustration of a control system that may be used with the machine of FIG. 1.

Referring to FIG. 2, tool control system 110 may include components configured to control the operation of machine 100 and, more specifically, tool 108. In particular, tool control system 110 may include a controller 200, a terrain profile 202, a positioning system 204, and a tool regulator 206. Additionally, tool control system 110 may include various sensors 208, such as, for example, a ground speed sensor, a slip sensor, a cylinder position sensor, a tool height sensor, and/or any other sensors known in the art. Tool control system 110 may be configured to interact with actuator 112 to control the extension and/or retraction thereof to affect movement of tool 108. Tool control system 110 may also be configured to interact with one or more auxiliary devices (not shown), such as, for example, a power source, a steering apparatus, a drive train apparatus, and/or other devices used to operate machine 100 and/or components thereof to selectively effect movement of machine 100 over surface 104. It is contemplated that tool control system 110 may additionally include operator interfaces, such as visual displays, warning indicators, sensors, and/or other components known in the art to display, affect, and/or control the operation of machine 100 and/or components thereof. It is also contemplated that controller 200, terrain profile 202, and positioning system 204 may be embodied in a single integral element, if desired.

Terrain profile 202 may include an electronic 3-D representation of surface 104 within worksite 102. Terrain profile 202 may be contained in a memory of controller 200 or may be a separate module in communication with controller 200. Terrain profile 202 may include terrain data such as elevation, material type, material properties, slip coefficient, and other data commonly known in the art. Terrain data may be collected from prior operation or movement of machine 100 within worksite 102, by manual site survey, by automated site survey systems utilizing stereo photography and data processors, and/or by any other methods commonly known in the art. Alternatively, data for terrain profile 202 may be provided from an external source (not shown) communicating with controller 200 via a direct data link (not shown) or a wireless communication link (not shown). Various types of wireless communication may include satellite, cellular, infrared, etc.

Positioning system 204 may be associated with machine 100 to determine a position of machine 100. Positioning system 204 may be located on machine 100 or be separate from machine 100, if desired. Positioning system 204 may be GPS based, laser based, or based on any other technology commonly known in the art to provide relative positioning. Additionally, positioning system 204 may communicate with controller 200 to determine the position of machine 100 within worksite 102. Controller 200 may also use positioning system 204 to determine a ground speed and/or acceleration of machine 100. As machine 100 traverses worksite 102, positioning system 204 may determine the actual work site geography as changes are made by tool 108 and communicate data to terrain profile 202 via controller 200 indicative of the new geography of surface 104. Thus, terrain profile 202 may be updated by positioning system 204 to reflect the affect tool 108 has on surface 203 as machine 100 traverses worksite 102.

Tool regulator 206 may receive a signal from controller 200 indicative of a desired position and/or orientation of tool 108, and control actuator 112 to move tool 108 to the desired position and/or orientation. Tool regulator 206 may be a separate module, as shown in FIG. 2. Alternatively, tool regulator 206 may be an integral part of controller 200, if desired. Tool regulator 206 may be configured to determine an actual position and/or orientation of tool 108 based on the position of tool 108 relative to machine 100. Tool regulator 206 may further be configured to generate a signal based on an actual position and/or orientation of tool 108 and communicate the signal to controller 200. Tool regulator 206 may embody any known or conventional apparatus.

Sensors 208 may be positioned on or around machine 100 to monitor and communicate with controller 200 the performance of machine 100 and tool 108. Sensors 208 may provide real time analysis of the operation of machine 100 and/or tool 108. It is contemplated that sensors 208 may monitor parameters indicative of a ground speed of machine 100, a slip rate of machine 100, a position and/or orientation of tool 108 (i.e. height, tilt, and rotation), an orientation of machine 100 (i.e. roll, pitch, and heading), a slope of surface 104, and/or any other parameters monitored in the art. Algorithms for the determination of the amount of slip are well known in the art, and may be based on the ground speed of machine 100 and other parameters known in the art, such as, for example, an output speed of a torque converter, a sprocket speed, a gear selection, and/or other such parameters. It is contemplated that the position of tool 108 may be determined with respect to machine 100 and/or worksite 102, as desired. Additionally, sensors 208 may help update terrain profile 202 to reflect the effect tool 108 has on surface 203 as machine 100 traverses worksite 102. Sensors 208 may serve as a backup source of data to controller 200 when terrain profile 202 differs from a true contour of surface 104. It is contemplated that controller 200 may function without aid from sensors 208. Thus, in some situations, sensors 208 may be omitted, if desired.

Controller 200 may embody a single microprocessor or multiple microprocessors that include a means for controlling an operation of tool 108 and/or machine 100. Numerous commercially available microprocessors can be configured to perform the functions of controller 200 and it should be appreciated that controller 200 could readily embody a general machine microprocessor capable of controlling numerous machine functions. Controller 200 may include a memory (not shown), a secondary storage device (not shown), a processor (not shown), wireless communication circuitry (not shown), external connection ports (not shown), and/or any other components for running an application. Various other circuits may be associated with controller 200 such as power supply circuitry (not shown), signal conditioning circuitry (not shown), solenoid driver circuitry (not shown), and/or other types of circuitry known in the art.

Controller 200 may be in communication with the various components of tool control system 110. In particular, controller 200 may be configured to communicate data with terrain profile 202, positioning system 204, tool regulator 206, auxiliary devices (not shown) of machine 100, and sensors 208. Controller 200 may receive and store in memory for subsequent display and/or calculation parameters indicative of the position, orientation, and performance of machine 100 and tool 108. For example, controller 200 may receive terrain information from terrain profile 202 and, based on a position communicated by positioning system 204, anticipate a trajectory of machine 100. Controller 200 may communicate with tool regulator 206 to control the position and/or orientation of tool 108 before and during movement of machine 100 along the trajectory. Controller 200 may perform calculations on the received data, and store results of the calculation in memory for use in future operations.

Controller 200 may be configured to determine a desired position and/or orientation of tool 108 based on information received from terrain profile 202, positioning system 204, tool regulator 206 and sensors 208. Controller 200 may be further configured to output a signal indicative of the determined position to tool regulator 206 to affect the position and/or orientation of tool 108. For example, if controller 200 determines that tool 108 is operating at a cut depth above a desired grade (i.e., tool 108 is not removing material that is desired to be removed) controller 200 may communicate with tool regulator 206 to lower tool 108 deeper into material 103. Similarly, if controller 200 determines that tool 108 is operating at a cut depth below a predetermined desired level (i.e., tool 108 is removing material 103 that is desired to remain) controller 200 may communicate with tool regulator 206 to raise tool 108 higher within material 103. Controller 200 may similarly tilt and rotate tool 108 to accommodate uneven variations in surface 104 and/or changes in surface composition (i.e. from a loose or viscous material to a hard or dry material)

Additionally, controller 200 may anticipate an effect on the contour of surface 104 caused by tool 108 when machine 100 traverses the anticipated trajectory, and adjust the position and/or orientation of tool 108 prior to and/or during the anticipated movement of machine 100. That is, controller 200 may anticipate the roll and/or pitch of machine 100 based on the anticipated trajectory and information from terrain profile 202, and adjust tool 108 to compensate for the movement of machine 100 and the contour of surface 104. For example, controller 200 may anticipate a forward pitch of machine 100 due to a sudden increase in incline in the contour of surface 104, and compensate for the changing pitch by raising the height of tool 108 with respect to surface 104 to inhibit tool 108 from digging too deeply into material 103. Controller 200 may also communicate with tool regulator 206 to adjust a tilt and rotation of tool 108 to compensate for an anticipated roll of machine 100 and changes in properties of material 103.

Figure 3:
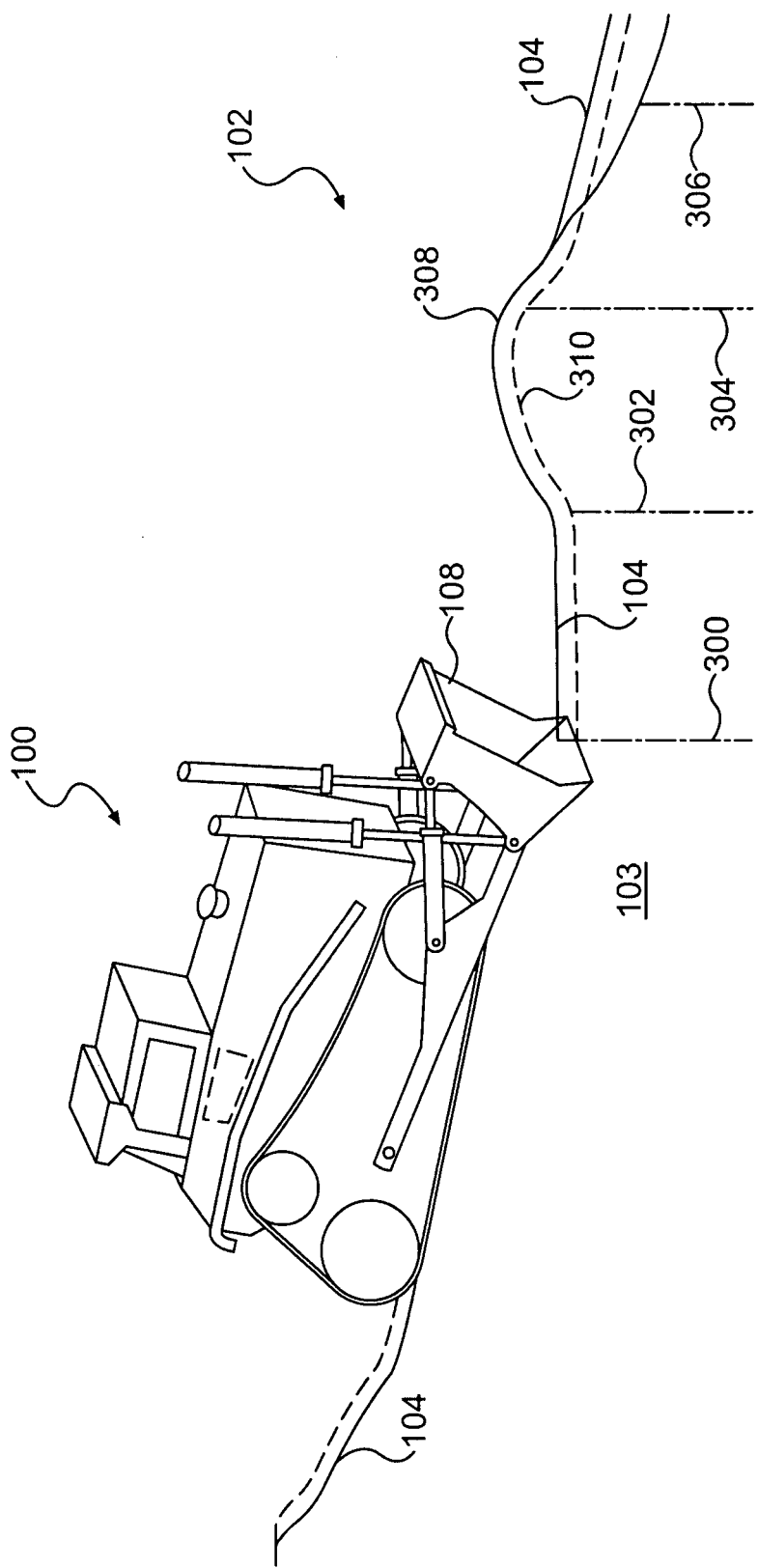
FIG. 3 is a pictorial illustration of an exemplary disclosed operation preformed by the machine of FIG. 1.

FIG. 3 illustrates various instances in time relating to a movement of machine 100 along an anticipated trajectory. A solid line 308 may correspond to a current contour of surface 104 prior to the traversal of machine 100. A dotted line 310 may correspond with a desired contour of surface 104 to be created by tool 108 as machine 100 follows the anticipated trajectory. Position 300 may correspond to a current location of machine 100. Positions 302, 304, 306, and 308 may correspond to future anticipated locations of machine 100. From position 300, machine 100 may encounter a steep incline at position 302 and experience a change in pitch. At position 302, if tool 108 is not raised, tool 108 may dig deeper into surface 104 than desired. At position 304 machine 100 may encounter a steep decline in the contour of surface 104 and pitch forward quickly causing tool 108 to dig deeper than desired into material 103, if tool 108 is not quickly raised. When moving from position 304 toward position 306, tool 108 may approach a steep decline on an operator's right side, and a shallow decline on the operators left hand side (i.e. machine 100 may experience a roll toward the right). At this position, if tool 108 is not raised on the right and lowered on the left, tool 108 may cut an undesired slope to the right, rather than keeping the profile level, as desired. Additionally, should any positions 302, 304, 306, and 308 have changing material compositions, tool 108 may need to be tilted fore or aft to inhibit tool 108 from digging too deep or shallow.

INDUSTRIAL APPLICABILITY

The disclosed tool control system may be applicable to any machine operating a tool to shape a surface of a worksite. The disclosed tool control system may anticipate an effect on the contour of the surface caused by the tool when the machine traverses the contour, and move the tool to accommodate the affect before the machine traverses the contour. In this manner, a desired cut profile may be maintained even when the machine traverses uneven terrain. The operation of tool control system 110 will now be explained.

Machine 100 may be used to modify the terrain of worksite 102 to achieve a desired contour within surface 104. Specifically, machine 100 may traverse worksite 102 to remove material 103 and expose a layer of desired material and/or provide a desired shape. As machine 100 traverses worksite 102, tool 108 may be raised, lowered, tilted, and/or rotated relative to surface 104 to affect the removal and/or reposition of material 103. As tool 108 affects the removal and/or repositioning of material 103, control system 110 may monitor and control the position of machine 100 relative to worksite 102 and the position of tool 108 relative to machine 100 to precisely remove and/or reposition material 103, as desired.

As machine 100 traverses worksite 102 in a terrain-shaping operation, as shown in FIG. 3, controller 200 may communicate with tool regulator 206 to adjust a position and/or orientation of tool 108 relative to surface 104. Specifically, controller 200 may anticipate a trajectory of machine 100 in relation to terrain profile 202, and determine the effect that will be caused by tool 108 on surface 104 in the anticipated trajectory. Controller 200 may communicate with tool regulator 206 to alter the position and/or orientation of tool 108 to compensate for the anticipated movement before machine 100 traverses the contour of surface 104. For example, as machine 100 approaches position 302, controller 200 may anticipate the sudden incline at position 302 and the corresponding backwards pitch machine 100 may experience while traversing position 302. Controller 200 may compensate for the backwards pitch of machine 100 by lowering tool 108 to maintain tool 108 on desired terrain profile 310.

In another example, as machine 100 reaches position 304, the center of gravity of machine 100 may encounter the steep decline causing machine 100 to rock or pitch forward suddenly. This sudden forward rocking of machine 100 may in turn cause tool 108 to plunge deeper in material 103 than desired. Controller 200 may anticipate this sudden pitch forward prior to the occurrence, and compensate for it by moving tool 108 upward, thereby keeping tool 108 on desired terrain profile 310. In yet another example, controller 200 may anticipate a roll of machine 100 caused by the differing elevations at position 306. Controller 200 may compensate for the roll toward the drivers right experienced by machine 100 by rotating tool 108 in the opposite direction of the roll. In yet another example, controller 200 may anticipate a change in material 103, such as a change from gravel to clay, and compensate for that change by adjusting the rotation of tool 108. That is, if material 103 changes from gravel to clay, controller 200 may anticipate the change and adjust tool 108 to a less aggressive attack angle (i.e. tilt tool 108 backwards about a horizontal axis parallel to the face of tool 108).

Because controller 200 may anticipate the effect tool 108 will have when machine 100 traverses an area, controller 200 may adjust the position and/or orientation of tool 108 to compensate for the pitch and/or roll of machine 100, material composition change, and/or changing contours in surface 104. By anticipating tool 108 movements in relation to terrain profile 202 and movement of machine 100, controller 200 may perform preventative operation to maintain tool 108 within a desired trajectory. This may prevent unnecessary efforts from being extended to fix spots where tool 108 moved from the desired trajectory due to changes in the contour of surface 104. Tool control system 110 may help eliminate the unintended removal or deposition of material, and may increase the productivity and precision of machine 100.

It will be apparent to those skilled in the art that various modifications and variations can be made to the disclosed tool control system without departing from the scope of the disclosure. Other embodiments of the tool control system will be apparent to those skilled in the art from consideration of the specification and practice of the tool control system disclosed herein. It is intended that the specification and examples be considered as exemplary only, with a true scope of the disclosure being indicated by the following claims and their equivalents.

What is claimed is:

1. A tool control system, comprising:
    a tool configured to shape a surface of a worksite;
    a positioning system configured to determine a worksite position of a machine supporting the tool; and
    a controller configured to:
        receive a terrain profile containing a contour of the surface;
        receive the worksite position of the machine;
        determine a contour of the surface not yet traversed by the machine;
        compensate for an expected effect on the contour caused by the tool when the machine traverses the contour, the effect being based on an anticipated pitching or rolling of the machine that will result from movement of a center of gravity of the machine from a first position on the worksite which has a first contour to a second position on the worksite which has a second contour that is different than the first contour; and
        move the tool and accommodate the effect before the machine traverses the contour, wherein tool movement is based primarily on the anticipated pitching or rolling, and secondarily on input from at least one sensor.

2. The tool control system of claim 1, wherein the tool is a blade.

3. The tool control system of claim 1, wherein the controller is configured to generate the terrain profile as the machine traverses the worksite.

4. The tool control system of claim 1, wherein the at least one sensor is configured to generate and send a signal to the controller indicative of at least one of a speed, a pitch, and a roll of the machine.

5. The tool control system of claim 4, further including at least a second sensor configured to generate and send a signal to the controller indicative of at least one of a position and/or an orientation of the tool.

6. The tool control system of claim 1, further including a tool regulator configured to communicate with the controller and control movement of the tool.

7. The tool control system of claim 1, wherein the controller is configured to move the tool based further on the terrain profile.

8. The tool control system of claim 1, wherein the controller is configured to move the tool based further on an anticipated change in material composition, as the machine traverses the contour.

9. A method of controlling a tool of a machine, comprising:
    receiving, at a controller, a current terrain profile;
    determining a position of a machine supporting the tool;
    determining a contour of a surface not yet traversed by the machine;
    compensating for an expected effect that is either digging beyond a desired depth or cutting an undesired profile in the contour caused by the tool when the machine traverses the contour, the effect being based on an anticipated pitching or rolling of the machine that will result from movement of a center of gravity of the machine from a first position on the worksite which has a first contour to a second position on the worksite which has a second contour that is different than the first contour; and
    moving the tool to accommodate the effect before the machine traverses the contour, wherein tool movement is based primarily on the anticipated pitching or rolling, and secondarily on input from at least one sensor.

10. The method of claim 9, further including monitoring and anticipating at least one of a speed of the machine and a change in material composition in the surface.

11. The method of claim 10, wherein compensating includes comparing stored information with monitored data.

12. The method of claim 9, further including monitoring and moving at least one of a position of the tool and an orientation of the tool with respect to the contour.

13. The method of claim 9, further including communicating the position of the machine, the current terrain profile, and the movement of the machine to anticipate the effect on the contour caused by the tool.

14. The method of claim 9, wherein receiving includes updating the current terrain profile as the machine traverses the contour.

15. The method of claim 9, wherein moving includes moving the tool based on an anticipated change in material composition.

16. The method of claim 9, wherein moving includes moving the tool based on the terrain profile.

17. A machine, comprising:
    a traction device;
    an engine configured to power the traction device;
    a frame connected to support the engine and the traction device;
    a tool connected to the frame and configured to shape a surface of a worksite;
    a tool regulator configured to position the tool;
    a positioning system configured to determine a worksite position; and
    a controller in communication with the tool regulator and positioning system, the controller being configured to:
        receive a terrain profile containing a contour of the surface;
        receive the worksite position of the machine;
        determine a contour of the surface not yet traversed by the machine;
        compensate for an expected effect on the contour caused by the tool when the machine traverses the contour, the effect being based on an anticipated pitching or rolling of the machine that will result from movement of a center of gravity of the machine from a first position on the worksite which has a first contour to a second position on the worksite which has a second contour different than the first contour; and control the tool regulator to move the tool to accommodate the effect before the machine traverses the contour, wherein tool movement is based primarily on the anticipated pitching or rolling, and secondarily on input from at least one sensor.

18. The machine of claim 17, wherein the tool is moved based on an anticipated change in composition of the worksite.

19. The machine of claim 17, wherein the machine is a track-type tractor and the tool is a blade.

* * * * *